United States Patent [19]

Wahl et al.

[11] Patent Number: 4,931,358

[45] Date of Patent: Jun. 5, 1990

[54] FIBER-REINFORCED THERMOPLASTIC PANELS

[75] Inventors: Ludwig Wahl, Schifferstadt; Helmut Vogel, Bramsche, both of Fed. Rep. of Germany

[73] Assignee: BASF Aktiengesellschaft, Ludwigshafen, Fed. Rep. of Germany

[21] Appl. No.: 281,754

[22] Filed: Dec. 9, 1988

[30] Foreign Application Priority Data

Dec. 9, 1987 [DE] Fed. Rep. of Germany ....... 3741669

[51] Int. Cl.$^5$ .............................................. B32B 15/00
[52] U.S. Cl. .................................... 428/285; 428/234; 428/246; 428/280; 428/282; 428/284; 428/286; 428/294; 428/300; 428/340; 428/408; 428/902

[58] Field of Search ............... 428/234, 280, 282, 293, 428/294, 300, 297, 298, 408, 902, 284, 340, 235, 239, 246, 285, 286

[56] References Cited

U.S. PATENT DOCUMENTS

| 4,350,727 | 9/1982 | Wald et al. | 428/300 |
| 4,749,613 | 6/1988 | Yamada et al. | 428/286 |
| 4,755,423 | 7/1988 | Greiser et al. | 428/293 |

Primary Examiner—James J. Bell
Attorney, Agent, or Firm—Oblon, Spivak, McClelland, Maier & Neustadt

[57] ABSTRACT

The invention relates to semifinished material consisting of a thermoplastic polymer and a needled textile fabric made up of at least two layers of oriented continuous filament yarn, each having an areal mass of not more than 300 g/m$^2$, and at least one layer of unoriented fibers.

3 Claims, No Drawings

FIBER-REINFORCED THERMOPLASTIC PANELS

The present invention relates to fiber-reinforced thermoformable semifinished material consisting of a thermoplastic polymer and a needled textile fabric.

DE-A 35 35 272 describes the use of needled web as textile fabric for the manufacture of thermoformable semifinished material. Needling makes it possible to impregnate the closely packed, unidirectionally oriented rovings with the thermoplastic melt. In a special embodiment of the invention given in Example 2 a layer of random-laid mat of areal mass 300 g/m² made from continuous glass filament and a layer of parallel glass fiber rovings of areal mass 700 g/m² are bonded by needling and impregnated with a thermoplastic. The unidirectionally oriented rovings increase the strength of the panel (or the molding made from it) in the preferred direction, while the random-laid mat enables impregnation by the plastic melt and makes it possible to form the material by pressing.

It has been found that particularly in thick panels with a high proportion of unidirectionally oriented fibers it is difficult or almost impossible to impregnate the oriented fibers with the thermoplastic melt, and that uniformly impregnated material cannot be made.

Usually two lengths of textile fabric are sandwiched between three layers of molten thermoplastic resin, which emerge from three slotted extruder dies, and fed to a heated double-band press. Two arrangements are possible. If the layers of oriented fibers are on the outside it is difficult for the matrix to penetrate to the middle of the sandwich; matrix-rich outer layers are formed, and these cause handling difficulties when molding is carried out because they block very much. If the layers of oriented fibers are on the inside there is a double layer of reinforcement that is difficult to impregnate, and a layer of thermoplastic remains in the middle. A common feature of both arrangements is that when the panel is molded unimpregnated rovings appear at the surfaces of the molding. If the layers of mat are arranged unsymmetrically the panels become very bowed.

The aim of the present invention was to manufacture thick panels with a high proportion of unidirectionally oriented fibers that do not exhibit the disadvantages described above. This aim is met by the semifinished material containing layers of fiber arranged as described in claim 1.

All thermoplastics are suitable for the manufacture of the semifinished material, including for instance olefin polymers, such as polyethylene or polypropylene, styrene polymers or copolymers and rubber-modified styrene polymers, polymers containing chlorine, such as poly(vinyl chloride) or chlorinated polyolefins, polyamides, poly(methyl methacrylate), polyesters made from terephthalic acid and saturated diols, polycarbonates, polysulfones, polyether sulfones, polyether ketones, and mixtures of these polymers. The plastics can contain the usual additives, such as fillers, pigments, dyes, antielectrostatic agents, stabilizers, and flame retardants.

The textile fabric includes at least two layers A consisting of continuous filament yarn oriented in at least one direction. The yarn—consisting of many individual filaments—may be laid down as parallel or unidirectionally oriented fibers, or as rovings, which are bundles of fibers. It is also possible to use woven material, in which the continuous filament yarn is oriented in two or more directions; in this case warp-reinforced materials are preferred. To ensure good impregnation the layers A must be comparatively thin, that is to say, their areal mass may not exceed 300 g/m²; preferably the areal mass of the layers A is 200 g/m² at most, in particular 150 g/m².

The textile fabric also includes at least one, preferably two layers B of unoriented fibers. For this purpose the usual random continuous-filament or staple-fiber mats or non-wovens are suitable. The layer B can also consist of chopped staple or continuous filament yarn laid down irregularly on the layer A.

A certain minimum proportion of unoriented fibers is required in the textile fabric, since the corresponding layers contain channels and voids into which the plastic melt can penetrate, and this increases the ability of the material to flow when moldings are formed from it. On the other hand, a high proportion of oriented fibers leads to moldings with favorable mechanical properties in the direction of fiber orientation. The ratio of the total mass of layers A to the total mass of layers B in the textile fabric is from 80:20 to 40:60, preferably from 75:25 to 50:50.

Textile glass fibers are preferred for the manufacture of these textile fabrics, but it is also possible to use carbon fibers, fibers made from aromatic polyamides or other thermoplastics, or combinations of different fibers. The stiffer reinforcing fibers may tied in with cross fibers with a soft size, particularly in the case of fiber lay-ups. It is also possible to lay up the fibers on a support of thermoplastic film and bond them to it by needling. The diameters of the filaments lie between 0.005 mm and 0.030 mm, preferably between 0.007 mm and 0.020 mm. Usually the fibers are treated with a size, to promote adhesion to the thermoplastic.

The layer arrangement ABAB is especially preferred, but the arrangements ABABAB and ABABABAB are also favorable. Individual layers can be of different areal masses and can consist of different types of fiber.

Needling bonds the individual layers, making the textile fabric. The fabric becomes resistant to shear, that is to say, the fiber bundles of the layers A no longer permit displacement. In the layers A the individual filaments are essentially undamaged, merely opened up, but in the layers B rupture occurs in a small proportion of the fibers, which leads to at least a limited degree of extensibility when the material is press molded. Needling is carried out with felting needles on normal needling machines. The number of penetrations per unit area can vary between wide limits, from 10 cm$^{-2}$ to 200 cm$^{-2}$; preferably it is between 20 cm$^{-2}$ and 100 cm$^{-2}$.

The semifinished material is manufactured by known processes, for example that described in DE-A 23 12 816. Batchwise manufacture with a hydraulic press is conceivable. The textile fabrics are combined with enough thermoplastic to give a mass fraction of fibers between 20% and 60%, preferably from 25% to 50%. The thickness of the material can be between 0.5 mm and 6 mm, depending on the areal mass of the needled woven or non-woven fabric; it is preferably from 2 mm to 4 mm.

In a preferred embodiment the novel semifinished material is manufactured by sandwiching two lengths of textile fabric between three layers of melt emerging from slotted extruder dies and impregnating them by pressing as described in, for instance, DE-A 29 48 235. The two lengths of fabric are preferably arranged so that layers A are on the outside and thus form the surfaces of the semifinished material, which then gives moldings with smoother surfaces because it is somewhat rich in matrix on the outside.

The novel semifinished material can be formed into moldings at temperatures above the softening temperature of the thermoplastic polymer by the usual stamping and pressing processes, giving parts for automotive and machine construction in particular.

EXAMPLE 1

A random web of continuous filament yarn of areal mass 150 g/m$^2$ is laid down on a layer of unidirectionally oriented fibers 1500 mm wide and of areal mass 150 g/m$^2$. Another layer of unidirectionally oriented fibers, also of areal mass 150 g/m$^2$, is applied over the web, then this too is covered by a random-laid web of continuous filament yarn. The combination is needled by means of felting needles in a needleloom in the usual way, the number of penetrations per unit area being 50 cm$^{-2}$, to give a fabric of areal mass 600 g/m$^2$. Two lengths of this fabric are impregnated with polypropylene by subjecting them to pressure between three layers of melt in the hot zone of a double-band press, then cooled under slight pressure. The product is 2.5 mm thick and the mass fraction of glass is 40%.

EXAMPLE 2

A web of continuous filament yarn of areal mass 75 g/m$^2$ is laid down on a layer of unidirectionally oriented fibers 1500 mm wide and of areal mass 150 g/m$^2$. Another layer of unidirectionally oriented fibers, also of areal mass 150 g/m$^2$, is applied over the web, then this is covered by a web of chopped strands, 50 mm to 100 mm long, of areal mass 75 g/m$^2$. The combination is needled (25 cm-2) and the fabric is reeled up. Two lengths of such fabric are bonded together by needling (25 cm$^{-2}$), and the resulting fabric, of areal mass 900 g/m$^2$, is impregnated with polypropylene. The product is 3.2 mm thick and the mass fraction of glass, two-thirds of which consists of unidirectionally oriented fibers, is 45%.

We claim:

1. Fiber-reinforced thermoformable semifinished material containing a thermoplastic polymer and a needled textile fabric, wherein the textile fabric consists of
    at least two layers A of continuous filament yarn oriented in at least one preferred direction, each having an areal mass of not more than 300 g/m$^2$ and
    at least one layer B of unoriented fibers in a ratio by mass of A:B from 80:20 to 40:60, wherein the textile fabric is built up from layers arranged as ABAB or ABABAB or ABABABAB.

2. Fiber-reinforced semifinished material containing two fabrics built up as claimed in claim 1 and so arranged that the surfaces of the semifinished material are formed by layers A.

3. Fiber-reinforced semifinished material as claimed in claim 1 wherein the textile fabric is of glass fibers or carbon fibers.

* * * * *